United States Patent
Chen

(10) Patent No.: US 9,420,040 B2
(45) Date of Patent: *Aug. 16, 2016

(54) HARDWARE RESOURCE ACCESSING SYSTEMS AND METHODS FOR ACCESSING HARDWARE RESOURCES IN BROWSER-BASED OPERATING SYSTEMS AND MACHINE-READABLE STORAGE MEDIUM THEREOF

(71) Applicant: VIA TECHNOLOGIES, INC., New Taipei (TW)

(72) Inventor: Chien-An Chen, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,390

(22) Filed: Dec. 21, 2015

(65) Prior Publication Data

US 2016/0112499 A1  Apr. 21, 2016

Related U.S. Application Data

(63) Continuation of application No. 13/835,249, filed on Mar. 15, 2013, now Pat. No. 9,253,249.

(60) Provisional application No. 61/674,470, filed on Jul. 23, 2012.

(51) Int. Cl.
  *G06F 15/16* (2006.01)
  *H04L 29/08* (2006.01)
  *G06F 9/54* (2006.01)

(52) U.S. Cl.
  CPC *H04L 67/10* (2013.01); *G06F 9/54* (2013.01); *H04L 67/02* (2013.01)

(58) Field of Classification Search
  CPC ............................ H04L 67/10; H04L 67/1002
  USPC .................................................. 709/203, 226
  See application file for complete search history.

(56) References Cited

U.S. PATENT DOCUMENTS

| | | | |
|---|---|---|---|
| 6,047,124 A | 4/2000 | Marsland | |
| 6,330,719 B1 * | 12/2001 | Zigmond | ............... H04L 29/06 348/E7.071 |
| 7,082,526 B2 | 7/2006 | Chang | |
| 2001/0039565 A1 | 11/2001 | Gupta | |

(Continued)

FOREIGN PATENT DOCUMENTS

| | | |
|---|---|---|
| CN | 101216777 | 7/2008 |
| TW | 564625 | 12/2003 |
| TW | I310502 | 6/2009 |

*Primary Examiner* — El Hadji Sall
(74) *Attorney, Agent, or Firm* — McClure, Qualey & Rodack, LLP

(57) ABSTRACT

Methods for accessing hardware resources in an electronic device with a browser-based operating system (OS) which includes a user interface running in a browser are provided. A local server is first provided on the electronic device, wherein the local server has a corresponding URL and a dedicated network port. Then, upon receiving a service request from the client-side web application, the local server analyzes a service type of the service request and performs an operation to at least one of the hardware resources corresponding to the service type, wherein the service request is generated and directed to the local server according to the URL and the dedicated network port of the local server by the client-side web application on the electronic device.

18 Claims, 8 Drawing Sheets

(56) References Cited

U.S. PATENT DOCUMENTS

| | | | | |
|---|---|---|---|---|
| 2005/0135597 A1* | 6/2005 | Blackwood | ............ | H04M 3/51 379/265.09 |
| 2008/0208789 A1 | 8/2008 | Almog | | |
| 2010/0131966 A1 | 5/2010 | Coleman et al. | | |
| 2013/0013841 A1 | 1/2013 | Jensen | | |
| 2013/0227056 A1 | 8/2013 | Vecera et al. | | |

* cited by examiner

```
<!--JavaScript function HardwareMonitor() replaces the html tag <script> node to import
http://localhost:10005/HardwareMonitor.js- -->
<script type="'text/javascript'"></script>

/*send importing request of hardware monitor to local socket server*/
function HardwareMonitor()
{
HeadNodeHM = document.getElementsByTagName('head')[0];//get html tag <head> node
OldLoadJSNodeHM = HeadNodeHM.getElementsByTagName('script')[1]; //get html tag
<script> node in html tag <head> node
NewLoadJSNodeHM = document.createElement('script');//create a new html tag <script> node
NewLoadJSNodeHM.setAttribute('type','text/javascript');//set the attribute of new html tag
<script> node to be 'text/javascript'
NewLoadJSNodeHM.onload=HMHandler;//set the handler when the HardwareMonitor.js is
imported completely
NewLoadJSNodeHM.src=" http://localhost:10005/HardwareMonitor.js";//set the resource of the
                                                                new html tag <script> node to be
                                //"http://localhost:10005/HardwareMonitor.js"
HeadNodeHM.replaceChild(NewLoadJSNodeHM, OldLoadJSNodeHM);//replace old html tag
<script> node to new html tag <script> node
}
```

FIG. 4B

HARDWARE RESOURCE ACCESSING SYSTEMS AND METHODS FOR ACCESSING HARDWARE RESOURCES IN BROWSER-BASED OPERATING SYSTEMS AND MACHINE-READABLE STORAGE MEDIUM THEREOF

CROSS REFERENCE TO RELATED APPLICATIONS

This application is a Continuation of pending U.S. application Ser. No. 13/835,249, filed on Mar. 15, 2013, which claims priority of U.S. Provisional Application No. 61/674,470, filed on Jul. 23, 2012, the entirety of which is incorporated by reference herein.

BACKGROUND OF THE INVENTION

1. Field of the Invention

The invention relates to methods and systems for accessing hardware resources, and more particularly, to methods and systems for accessing hardware resources in electronic devices with browser-based operating systems.

2. Description of the Related Art

Most desktop operating systems (OSs) are designed to work with applications installed and executed locally using solid-state storage or a hard drive. Recently, with improvements in computer technology and growth in processor design, cloud computing has been used widely in many applications. A browser-based OS, such as Chromium OS, is a simplified operating system that runs a web browser to allow the use of cloud computing to access applications and data in the cloud. The browser-based OS boots into a web browser as its user interface instead of a typical desktop on regular operating systems. The browser-based OS may be designed for electronic devices that are mainly used to browse the Internet, such as Netbooks, Mobile Internet Devices, PCs, mobile phones, and so on.

Such browser-based OSs work exclusively with web applications, which are composed with web languages, such as HTML (Hypertext Markup Language) or JavaScript. The browser-based OS includes a browser running on a stripped-down version of a kernel such as Linux while the applications run on the Internet instead of Linux. Because of its simplicity, the browser-based OSs can boot extremely quickly and are easy to use. However, with everything stored on the cloud, hardware requirements for electronic devices with browser-based OSs are relatively low and hardware capabilities are also limited. In addition, for reasons of security and technological limitations, the web applications running in a browser-based OS cannot directly communicate with device drivers and cannot access hardware resources as a native operating system can.

BRIEF SUMMARY OF THE INVENTION

Hardware resources accessing systems for use in an electronic device and method for accessing hardware resources in an electronic device using the same are provided.

In one embodiment, a method for accessing hardware resources in an electronic device with a browser-based operating system (OS) which comprises a client-side web application running in a browser is provided. The method comprises the following steps. A local server is first provided on the electronic device, wherein the local server has a corresponding Universal Resource Locator (URL) and a dedicated network port. Upon receiving a service request from the client-side web application, a service type of the service request is analyzed and an operation is performed to at least one hardware resource corresponding to the service type by the local server, wherein the service request is generated and directed to the local server according to the URL and the dedicated network port of the local server by the client-side web application on the electronic device.

Another exemplary embodiment of a hardware resources accessing system for use in an electronic device with a browser-based OS comprising a user interface running in a browser comprises a plurality of hardware resources, a client-side web application and a local server on the electronic device. The client-side web application runs in the browser for generating a service request with a service type. The local server has a corresponding URL and a dedicated network port. Upon receiving a service request with a service type, the client-side web application directs the service request to the local server according to the URL and the network port of the local server such that the local server determines the service type and performs an operation to at least one of the hardware resources corresponding to the service type.

Methods and systems may take the form of a program code embodied in a tangible media. When the program code is loaded into and executed by a machine, the machine becomes an apparatus for practicing the disclosed method.

BRIEF DESCRIPTION OF THE DRAWINGS

The invention can be more fully understood by reading the subsequent detailed description and examples with reference to the accompanying drawings, wherein:

FIG. 4B is a schematic diagram illustrating an embodiment of an exemplary source code for accessing local hardware resources of the invention;

DETAILED DESCRIPTION OF THE INVENTION

This description is made for the purpose of illustrating the general principles of the invention and should not be taken in a limiting sense. The scope of the invention is best determined by reference to the appended claims.

Figure 1:
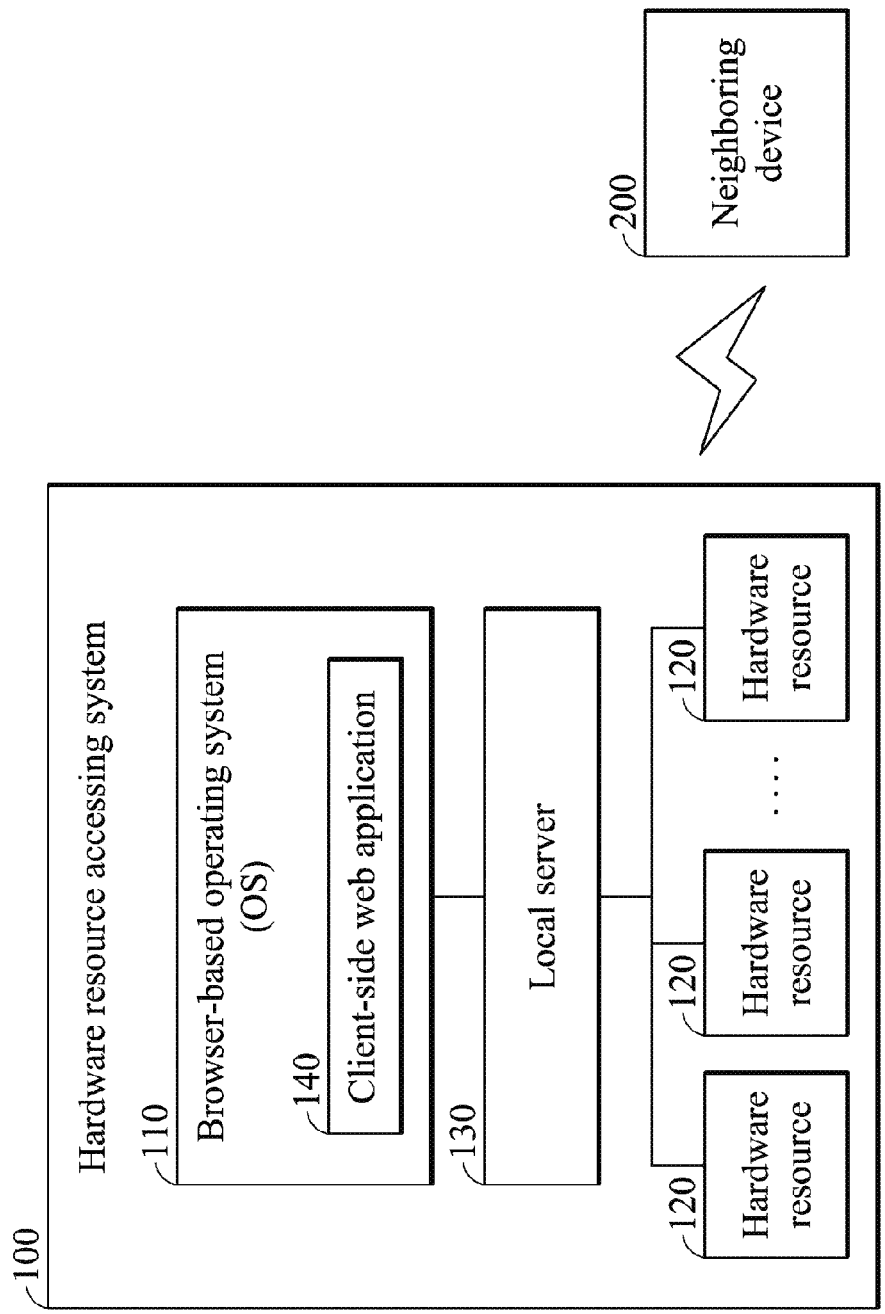
FIG. 1 is a schematic diagram illustrating an embodiment of a hardware resource accessing system of the invention.

FIG. 1 is a schematic diagram illustrating an embodiment of a hardware resource accessing system of the invention. The hardware resource accessing system 100 may be used in an electronic device, such as a computer system, e.g. a personal computer (PC), a handheld device and/or portable device, e.g. a laptop computer, a PDA (personal digital assistant), a network computer, a mini-computer, a Netbook, a Mobile Internet Device, an Ultrabook, or any other type of similar device. However, it is to be understood that the invention is not limited thereto.

The hardware resource accessing system 100 comprises a browser-based OS 110, a plurality of hardware resources 120 and a local server 130. The browser-based OS 110 is a simplified OS that includes a browser (not shown) running on a stripped-down version of a kernel, such as Linux, and boots into the browser as its user interface. In one embodiment, for example, the browser-based OS 110 is the Chromium OS, but the invention is not limited thereto. The hardware resources 120 may comprise peripheral devices, such as a memory unit, a display unit, a south bridge chip, and/or a north bridge chip, sensors therein and interfaces, such as universal serial bus (USB) connection ports and I/O ports. For example, the hardware resources 120 that may be monitored or controlled may include, but are not limited to, CPU operation voltages, CPU fan speeds, CPU temperatures, CPU clocks, CPU loadings, hard drive temperatures, RAM information, graphics card information, power supply control, and so on. The local server 130 is configured on the electronic device, which may receive a service request from a client-side web application 140, communicate with corresponding hardware resources 120 to perform an operation corresponding to the service request, and further reply with the information corresponding to the service request to the requested client-side web application 140. The local server 130 has a corresponding Universal Resource Locator (URL), e.g. 127.0.0.1, and a dedicated network port, e.g. the net socket port: 10005. The local server 130 may be implemented via software or hardware. In one embodiment, the local server 130 is implemented via software. It is understood that each of the hardware resources 120 may have a corresponding hardware driver (not shown) for controlling the access thereto and the local server 130 may communicate with the drivers of the hardware resources 120 to obtain hardware information therefrom. For example, the local server 130 may communicate with the USB driver of a USB connection port to access data via the USB connection port or communicate with a specific hardware driver to obtain hardware information of the processing unit. The local server 130 is designed to perform function calls to the drivers (in the kernel of the browser-based OS) of the hardware resources 120, and to reply the hardware information by folding such received hardware information within a message (e.g., an HTML document) and returning the message to the client-side web application 140.

The client-side web application 140 may be run in the browser of the browser-based OS. The client-side web application 140 is composed with web languages, such as HTML or client-side web browser scripting languages such as JavaScript. The client-side web application 140 may comprise a user interface for displaying and indicating information regarding the hardware resources 120. The client-side web application 140 may be an application capable of generating a hardware access request to the local server 130 and/or an application capable of receiving data from the local server 130 and then performing an operation corresponding to the received data.

It is understood that the client-side web application 140, the browser-based OS 110, and the drivers of the hardware resources 120 may first be stored in a storage unit (not shown in FIG. 1) and may then be loaded by the processing unit (not shown in FIG. 1) to a memory unit (not shown in FIG. 1) for operation. The browser-based OS 110 may then boot into the browser as its user interface and the client-side web application 140 may run in the browser. The hardware resource accessing system 100 may perform the method for accessing hardware resources of the invention, which will be discussed further in the following paragraphs.

The hardware resource accessing system 100 may further communicate with a neighboring device 200 that is a neighbor to the electronic device with the hardware resource accessing system 100 via a specific hardware interface, such as a USB connection port and a wireless technology used therebetween, such as Bluetooth, to obtain the hardware information of hardware resources from the neighboring device 200, or transmit commands to and/or receive commands from the neighboring device 200 via the specific hardware interface and the wireless technology. To be more specific, a hardware unit (e.g. an interface board) may be provided to communicate with the local server 130 via the specific hardware interface and communicate with the neighboring device 200 to transmit commands to and/or receive commands from the neighboring device 200 via the wireless technology, wherein the hardware unit may be configured in the electronic device or be external to the electronic device. The neighboring devices 200 may comprise any type of electronic devices, such as mobile phones, displays, household appliances, robotics, and so on.

Figure 2:
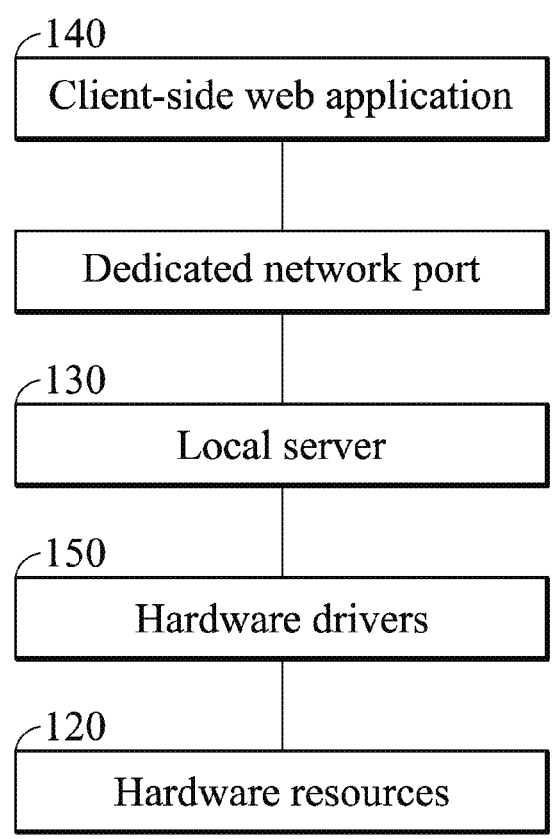
FIG. 2 is a schematic diagram illustrating another embodiment of the hardware resource accessing system of the invention.

FIG. 2 is a schematic diagram illustrating another embodiment of the hardware resource accessing system 100 of the invention. The hardware resource accessing system 100 may be used in an electronic device, such as a computer system, but it is not limited thereto. As shown in FIG. 2, the client-side web application 140 for the hardware-monitoring application communicates with the local server 130 via a predetermined network port, e.g. a net socket port: 10005. The local server 130 may then communicate with the hardware drivers 150 for retrieving hardware information of the local hardware resources 120. For example, in one embodiment, the local server 130 may retrieve hardware information by a function call to a hardware driver 150, such as "lm-sensors" under Linux, which provides the base software layer for utilities to acquire data on the environmental conditions of the hardware resource, such as CPU operation voltages, CPU fan speeds, CPU temperatures, CPU clocks, CPU loadings, hard drive temperatures, RAM information, graphics card information, power supply control, and so on. The local server 130 subsequently delivers a response message containing the required hardware information, just like providing a service to usual web applications. In some embodiments, in addition to accessing the local hardware resources, the client-side web application 140 may also communicate with a neighboring device 200 to obtain the hardware information of hardware resources from the neighboring device 200 via a specific hardware interface, such as a USB connection port.

Methods for accessing hardware resources in an electronic device with a browser-based OS which comprises a client-side web application running in a browser will be discussed in detail below.

Figure 3:
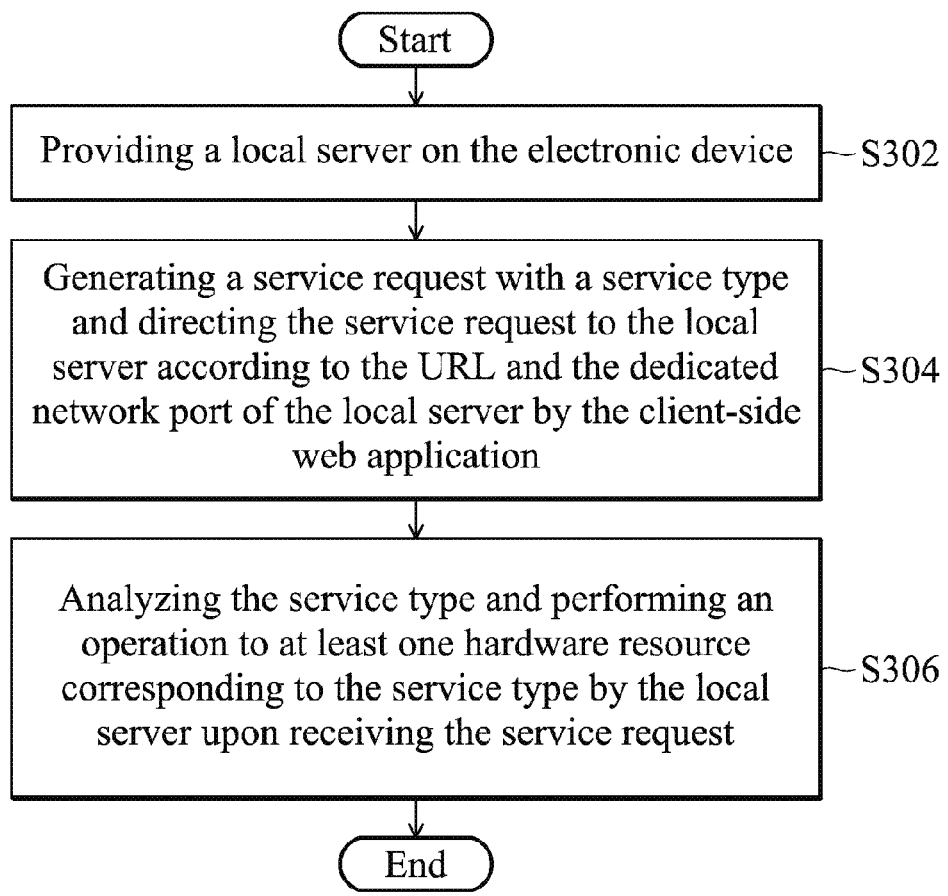
FIG. 3 is a flowchart of an embodiment of a method for accessing hardware resources of the invention.

FIG. 3 is a flowchart of an embodiment of a method for accessing hardware resources of the invention. The method for accessing hardware resources may be used in an electronic device with a browser-based OS which comprises a client-side web application running in a browser, such as a computer with the hardware resource accessing system 100.

In step S302, a local server is provided on the electronic device, wherein the local server has a corresponding Universal Resource Locator (URL), e.g. 127.0.0.1, and a dedicated network port, e.g. the net socket port: 10005. Then, when a user requests to access hardware resources (e.g. to monitor or control specific hardware resources), in step S304, the client-side web application on the electronic device generates a service request with a service type and directs the service request to the local server according to the URL and the dedicated network port of the local server. Upon receiving the service request from the client-side web application, in step S306, the local server analyzes the service type and performs an operation to at least one hardware resource corresponding to the service type.

In one embodiment, the service type comprises obtaining specific hardware information of the electronic device to request for local hardware monitoring. The local server may further analyze the received service request to obtain a service type (such as a function call to corresponding application programming interfaces (APIs)), perform an operation to the specific hardware resources to obtain the hardware information corresponding thereto, and reply with a message containing the requested hardware information to the client-side web application.

Figure 4A:
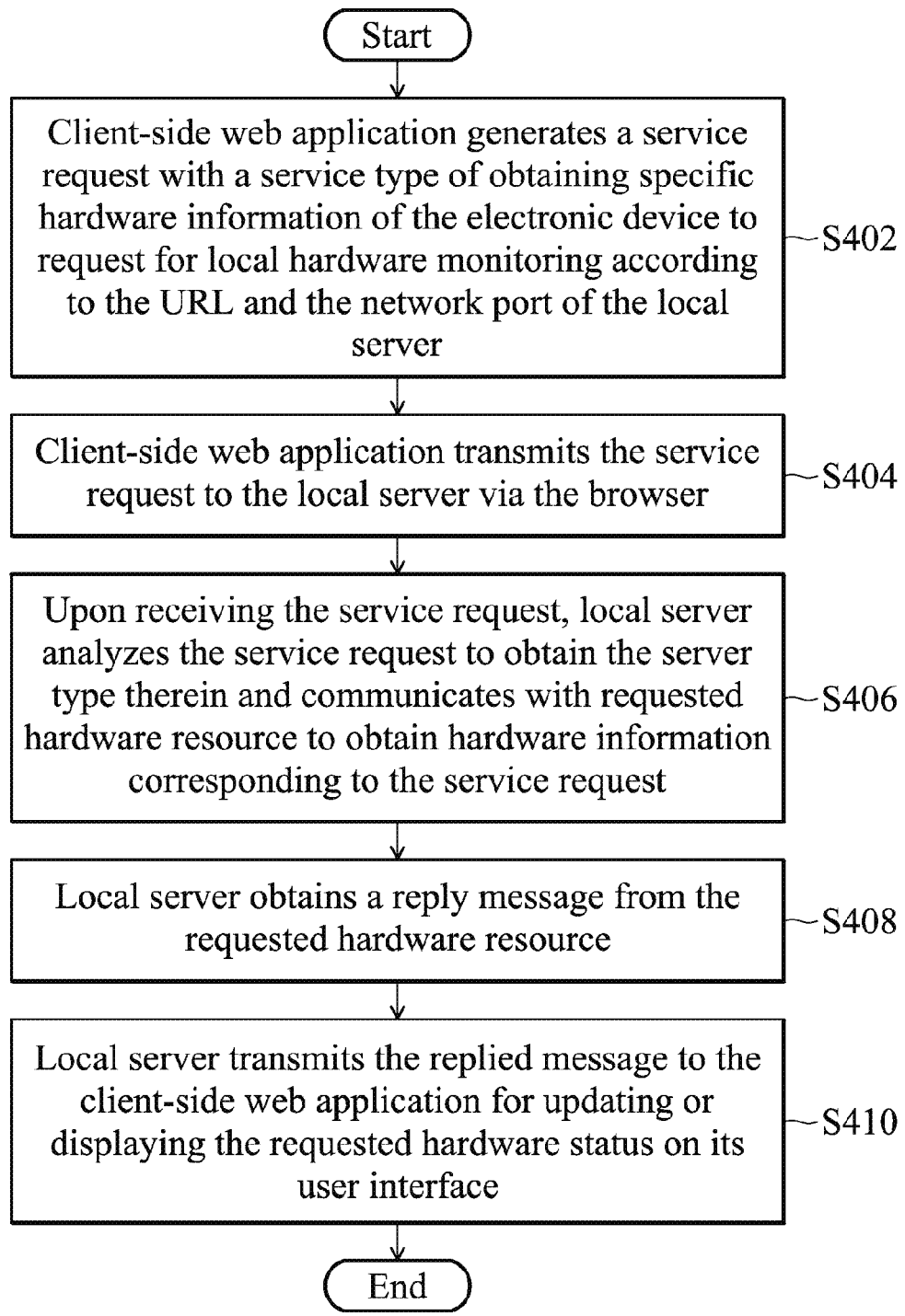
FIG. 4A is a flowchart of an embodiment of a method for accessing local hardware resources of the invention.

FIG. 4A is a flowchart of an embodiment of a method for accessing local hardware resources of the invention. The method for accessing hardware resources may be used in an electronic device with a browser-based OS which comprises a client-side web application running in a browser, such as a computer system.

First, the client-side web application generates a service request with a service type of obtaining the specific hardware information of the electronic device to request for local hardware monitoring according to the URL and the network port of the local server (step S402). In one embodiment, the service request may be generated in response to the user's action in the web application; in another embodiment, the service request may be generated periodically to constantly monitor the hardware of interest. Then, the client-side web application may transmit the service request to the local server via the browser (step S404). Upon receiving the service request, the local server analyzes the service request to obtain the server type therein and communicates with requested hardware resource to obtain hardware information corresponding to the service request (step S406). The service type, which may be a function call to corresponding APIs, may indicate a hardware monitoring request, and thus a hardware monitoring operation to the hardware resources to be monitored may be performed. The local server then obtains a reply message from the requested hardware resource (step S408) and transmits the replied message containing the requested hardware information to the client-side web application for updating or displaying the requested hardware status on its user interface (step S410).

It is understood that the client-side web application 140 may be executed by various schemes such as static web page technology or dynamic web page technology. In one embodiment, when the client-side web application 140 is implemented as a dynamic web page, the user may make requests for data from the server that will be assembled on-the-fly according to what is requested. Dynamic pages may change every time they are loaded, and they may change their content based on what the user does, such as actions to generate service requests obtaining the hardware information. Dynamic web pages may be constructed by client-side scripting or server-side scripting. Conventionally, in client-side scripting, client-side scripts embedded within an HTML document are executed by the user's web browser, which then displays the document including visible output from the script. Client-side scripts may also contain instructions for the browser to follow in response to certain user actions. In contrast, server-side scripts embedded within an HTML document are executed by the web server to generate output which is then sent to the user's web browser. Client-side scripts have greater access to the information and functions available on the user's browser, whereas server-side scripts have greater access to the information and functions available on the server.

Client-side scripting benefits by providing an improved user interface in which the user does not experience the unfriendly "refreshing" of the web page, but instead sees perhaps an animated GIF file indicating that the request occurred and the page will be updated shortly.

In some embodiments, the client-side web application 140 of the present invention is constructed by client-side web browser scripting languages, such as JavaScript used for Dynamic HTML (DHTML). The scripting language may also allow the use of remote scripting, a technique by which the DHTML page requests additional information from a server using, for example, an XMLHttpRequest object which is an API for transferring data between clients and servers.

In one embodiment using JavaScript, the step of directing the service request to the local server according to the URL and the network port of the local server may be implemented by dynamic JavaScript insertion. Dynamic JavaScript insertion comprises the steps of defining a new <script> element in a source code of the client-side web application 140 (e.g. the HTML file) which includes the URL and the dedicated network port of the local server, and replace the original <script> element in the head section in the source code of the client-side web application 140 with the new <script> element. In this embodiment, the step of directing the service request to the local server according to the URL and the network port of the local server 130 to generate a hardware-monitor request in JavaScript performed by the client-side web application 140 may further comprise following steps: (1) Define a new JavaScript node <script> in the source code of the client-side web application 140 (e.g. the HTML file) (2) Search the <script> node in the head section of the source code of the client-side web application 140; (3) Set a callback function to receive the returned responses from the local server 130; (4) Replace the <script> node in the head section with the new node which includes the URL of the local server 130; and (5) The browser sends a request to the URL of the local server 130. FIG. 4B shows an example of this part of the source code.

In another embodiment, the step of directing the service request to the local server according to the URL and the network port of the local server performed by the client-side web application 140 may further comprise the steps of creating an XMLHttpRequest object and opening the XMLHttpRequest object with the URL and the network port of the local server 130.

Without using client-side scripting such as JavaScript, the entire web page must be refreshed and the local server 130 is required to respond with the whole HTML webpage code, resulting in a large amount of data for transmission. By using client-side scripting, the local server 130 may just respond with simple JavaScript variables by asynchronous transmission. Thus, the work of the local server 130 may be simplified and refined to process necessary messages only, while the other parts are handed over to the browser and the client-side web application 140.

In some embodiments, if the client-side web application is implemented as a JavaScript webpage, the user interface of the client-side web application may be divided into a number of JavaScript areas, each area having a JavaScript variable corresponding thereto, and an asynchronous transmission may be performed between the local server and the client-side web application to deliver JavaScript variables only and update the JavaScript variables in the corresponding JavaScript areas only, instead of updating the full page of the webpage provided by the client-side web application. FIG.

Figure 5A:
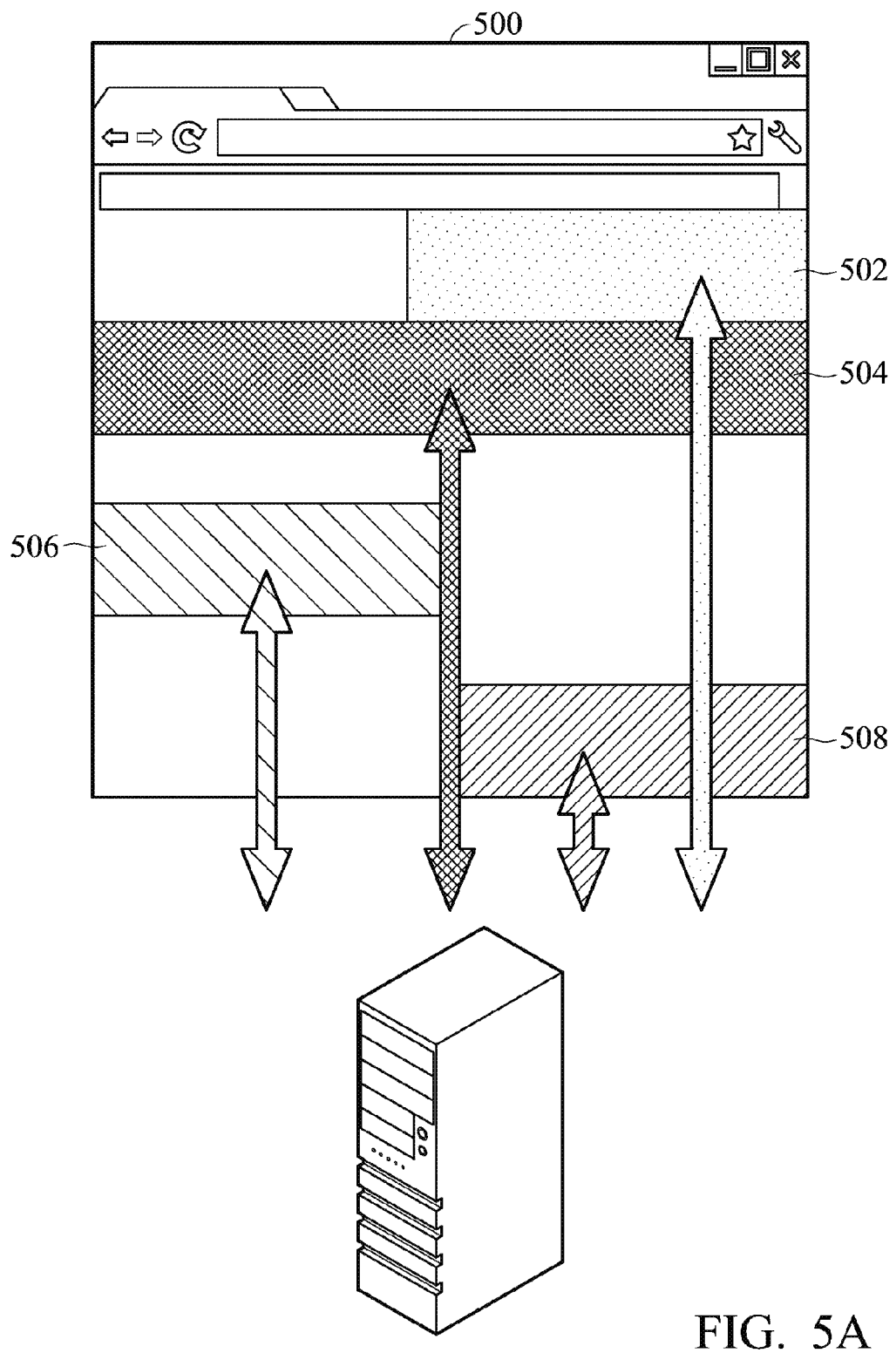
FIG. 5A is a schematic diagram illustrating an embodiment of an exemplary web page related to the client-side web application of the invention.
Figure 5B:
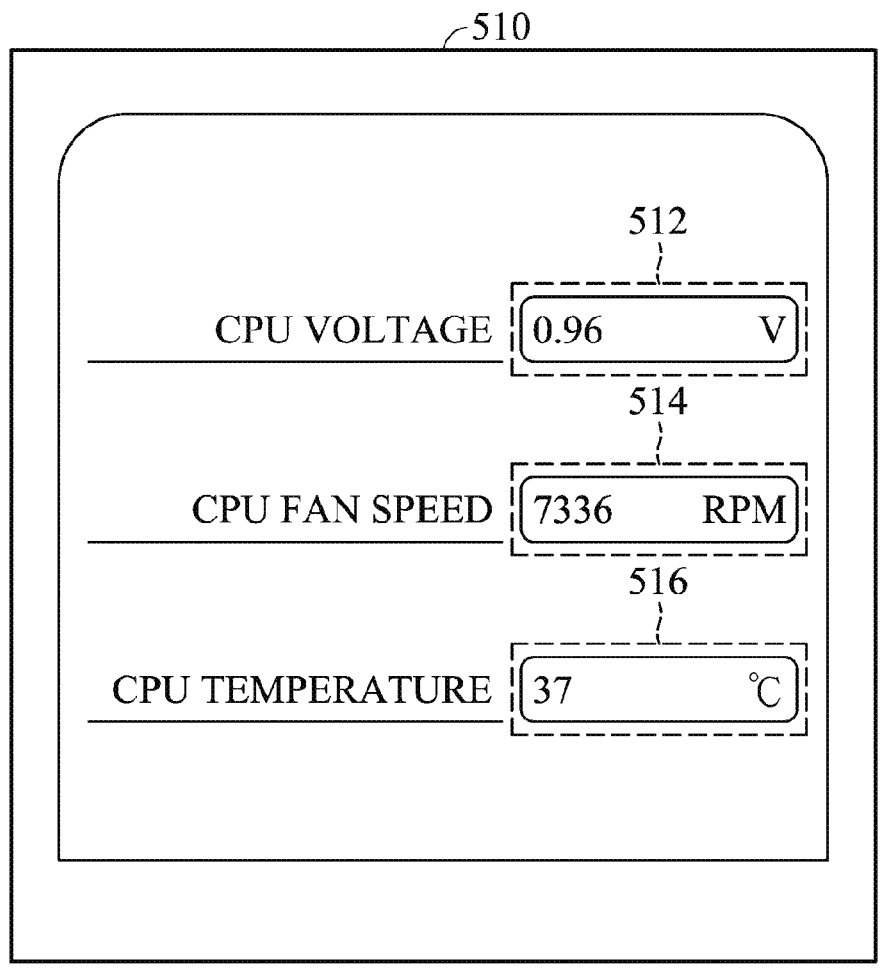
FIG. 5B is a schematic diagram illustrating an embodiment of an exemplary user interface of the client-side web application of the invention.

5A is a schematic diagram illustrating an embodiment of an exemplary web page related to the client-side web application of the invention. As shown in FIG. 5A, the JavaScript webpage 500 provided by the client-side web application 140 is divided into JavaScript areas 502-508, wherein each of the JavaScript areas 502-508 may have responsive JavaScript variables and the JavaScript variables in the corresponding JavaScript areas may be updated only when an updating of the webpage 500 is required. FIG. 5B is a schematic diagram illustrating an embodiment of an exemplary user interface of the client-side web application of the invention. As shown in FIG. 5B, the webpage containing the user interface 510 may comprise three items 512-516 for hardware monitoring, which are information regarding CPU voltage, CPU fan speed, and CPU temperature, respectively. Each of the items 512-516 has a JavaScript area and a related JavaScript variable corresponding thereto. An asynchronous transmission may then be performed between the local server and the client-side web application to deliver JavaScript variables only and update the JavaScript variables in the corresponding JavaScript areas of the items 512-516 only.

Figure 6:
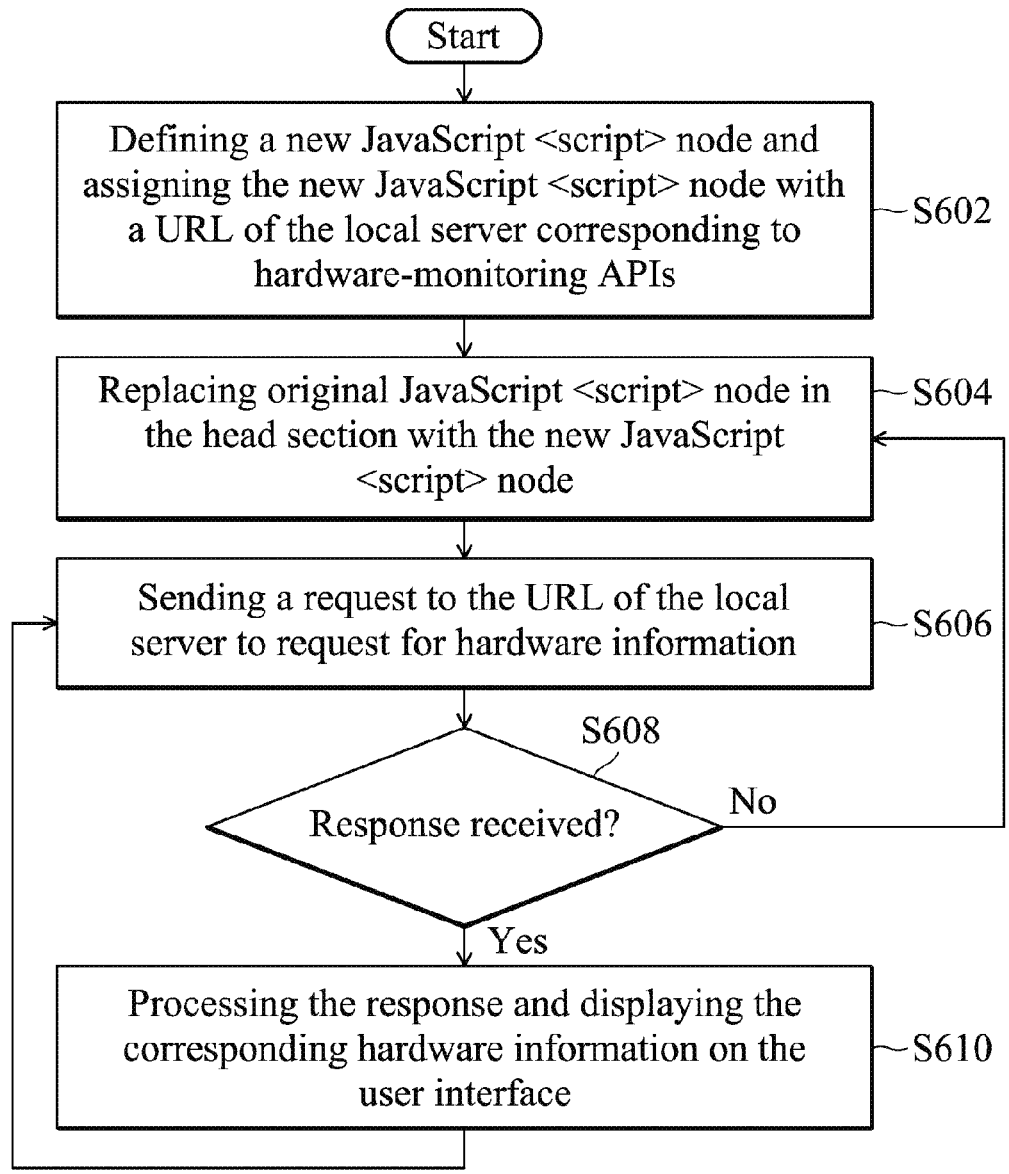
FIG. 6 is a flowchart of an embodiment of a method for continuously monitoring hardware information in a browser-based OS using a client-side web application in Javascript, of the invention.

FIG. 6 is a flowchart of an embodiment of a method for continuously monitoring hardware information in a browser-based OS using a client-side web application in Javascript of the invention. The method for accessing hardware resources may be used in an electronic device with a browser-based OS which comprises a client-side web application running in a browser, such as a computer system with the hardware resource accessing system 100 as shown in FIG. 1. The hardware resources that may be monitored or controlled may include, but are not limited to, CPU operation voltages, CPU fan speeds, CPU temperatures, CPU clocks, CPU loadings, hard drive temperatures, RAM information, graphics card information, power supply control, and so on.

When the client-side web application 140 is started, a new JavaScript <script> node is defined and assigned with a URL of the local server 130 corresponding to hardware-monitoring APIs (step S602). The original JavaScript <script> node in the head section is then replaced with the new JavaScript <script> node (step S604). For example, in one embodiment, the original Javascript node <script> in the head section of the source code may be replaced with a source address to a new API request of "http://localhost:10005/HardwareMonitor.js", wherein the "localhost" and "10005" respectively indicate the URL and the dedicated network port of the local server 130, and "HardwareMonitor.js" indicates the corresponding hardware-monitoring API request for hardware monitoring. Subsequently, a request is sent to the URL of the local server 130 to request hardware information (step S606). Because the request is sent to the URL of the local server 130, the local server 130 receives the request, analyzes the service type of the request and then communicates (i.e., performs function calls) with the drivers of the specific hardware resources to obtain hardware information therefrom accordingly. It is then determined whether any response is received (step S608). If a response is received, the response is processed and the corresponding hardware information is displayed (step S610). For example, referring to FIG. 5B, if a response with information regarding the JavaScript variables "voltage=1.12", "fan_speed=7500" and "Temperature=35" corresponding to the JavaScript areas of the items 512-516 were received, the displayed data of the items 512-516 will be updated to "1.12 V", "7500 RPM" and "35° C." respectively. The process is repeated to continuously monitor the hardware information. If no response is received (No in step S608), which may be due to connection failure, abnormal operations of the local server 130, etc., the client-side web application 140 returns to the replace step S604 to repetitively send requests to the local server 130 until a response is received.

In some embodiments, the user interface of the client-side web application may further provide additional information for indicating whether an external device has been plugged in or whether any information from the external device or other hardware resources have been received.

In another embodiment, the service type further comprises obtaining specific hardware information of the neighboring device 200 (such as a mobile phone) and the local server 130 may further transmit a command to the neighboring device 200 to obtain the specific hardware information therefrom and then transmit the obtained specific hardware information of the neighboring device 200 to the client-side web application 140. For example, the client-side web application 140 on the local host may send a service request with a service type of remote access according to the URL and the dedicated network port, e.g. the net socket port: 10005, to the local server 130 via the dedicated network port. After receiving the service request, the local server 130 performs a function call to APIs provided by specific drivers (e.g. the USB drivers) to read/write via a specific hardware interface, e.g. the USB connection port, and subsequently the electronic device at the local side may communicate with the neighboring device 200 via a wireless technology such as Bluetooth.

In yet another embodiment, the neighboring device 200 may further send a request indicating a service type of remote monitoring to monitor the hardware information of the local electronic device with the hardware resource accessing system 100 to the local electronic device via the specific hardware interface, e.g. the dedicated USB connection port. The local server 130 may then receive the request via the dedicated USB connection port and communicate with the drivers of responsive local hardware resources to obtain hardware information of specific local hardware resources. After obtaining the hardware information of specific local hardware resources, the local server 130 delivers a response containing such information via the dedicated USB connection and wireless technologies to the neighboring device 200.

In addition to hardware monitoring, the web applications running in a browser-based OS also cannot be as easily controlled from a neighboring device as those running in a native operating system can be. In still another embodiment, the neighboring device 200 may further send a request to control the operation of the electronic device with the hardware resource accessing system 100 via the specific hardware interface, e.g. the dedicated USB connection port. Upon receiving a request (e.g. a command) from the neighboring device 200 via the specific hardware interface and the dedicated wireless technology, the local server 130 analyzes the request and performs an operation corresponding to the analyzed result. When the request from the neighboring device 200 indicates a control operation, the local server 130 analyzes the request to obtain a control command corresponding thereto and transmits the control command to the client-side web application 140 such that the client-side web application 140 performs an operation corresponding to the control command. When the request from the neighboring device 200 indicates a hardware monitoring request, the local server 130 obtains the hardware information of the electronic device and transmits the obtained hardware information to the neighboring device 200 via the specific hardware interface.

For example, the neighboring device 200 may first send a control command (e.g., a command to play a video in the local electronic device) via the Bluetooth wireless technology and USB connections to the local server 130. The local server 130 receives such a command and the client-side web application 140 of the browser-based OS 110 sends corresponding requests to the browser-based OS 110. After receiving responses corresponding to such a command, the client-side web application 140 may perform a responsive operation accordingly (e.g., play a video).

Alternatively, in some embodiments, the neighboring device 200 may be controlled by the client-side web application 140 running in the browser-based OS 110. The client-side web application 140 may send commands via the local server 130 and the specific hardware interface, such as USB connections and wireless technologies in the fashion described above, to control the operation of the hardware resources of the neighboring device 200. It is to be noted that the neighboring devices 200 to be controlled may comprise any type of electronic device, such as mobile phones, displays, household appliances, robotics, and so on. For example, the client-side web application 140 may turn on/off or change the settings of displays or household appliances.

Therefore, the hardware resource accessing systems and methods for hardware resource accessing of the invention may provide a customized local server which includes a local URL and a dedicated network port on the local electronic device to communicate with the drivers of the hardware resources to be controlled or monitored to access device drivers and hardware resources via a designed client-side web application in a browser-based OS. The customized local server is designed to perform function calls to APIs to request hardware-related services from the kernel of the browser-based OS, and to reply the hardware information by folding such received hardware information within a message (e.g., an HTML document) and returning the message to the client-side web application, such that the hardware monitoring or remote controlling operation between the electronic device with the browser-based OS and a neighboring device that is a neighbor to the electronic device may be performed efficiently.

Methods for hardware resource accessing or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by ways of examples and in terms of preferred embodiments, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for accessing hardware resources in an electronic device having an operating system, comprising:
providing a local server on the electronic device having the operating system, wherein the local server has a corresponding Universal Resource Locator (URL) and a dedicated network port, and wherein the operating system runs a browser to use cloud computing to access web applications in the cloud and uses the browser as a user interface; and
upon receiving a service request from a web application running in the browser of the operating system of the electronic device, analyzing a service type of the service request and performing, by the local server, an operation to at least one hardware resource corresponding to the service type,
wherein the service request is generated and directed to the local server according to the URL and the dedicated network port of the local server by the web application running in the browser of the operating system,
wherein the service request is generated periodically.

2. The method as claimed in claim 1, wherein the service request is generated periodically by the web application until a response is received from the local server.

3. The method as claimed in claim 1, wherein the service type comprises obtaining specific hardware information from the at least one hardware resource of the electronic device.

4. The method as claimed in claim 3, wherein the local server obtains the specific hardware information from the at least one hardware resource of the electronic device by performing function calls to request services corresponding to the specific hardware information from a kernel of the operating system.

5. The method as claimed in claim 1, wherein the service type comprises obtaining specific hardware information of a neighboring device.

6. The method as claimed in claim 5, wherein the method further comprises:
transmitting, by the local server, a command to the neighboring device to obtain specific hardware information therefrom; and
transmitting, by the local server, the obtained specific hardware information of the neighboring device to the web application.

7. An electronic device having an operating system, comprising:
a local server on the electronic device having the operating system, the local server having a corresponding URL and a dedicated network port; and
a processing unit, loading the operating system to a memory unit for operation, wherein the operating system runs a browser to use cloud computing to access web applications in the cloud and uses the browser as a user interface, and wherein a web application runs in the browser of the operating system of the electronic device for generating a service request with a service type,
wherein the web application directs the service request to the local server according to the URL and the dedicated network port of the local server, such that the local server analyzes the service type and performs an operation to at least one hardware resource corresponding to the service type,
wherein the service request is generated periodically.

8. The electronic device as claimed in claim 7, wherein the service request is generated periodically by the web application until a response is received from the local server.

9. The electronic device as claimed in claim 7, wherein the service type comprises obtaining specific hardware information from the at least one hardware resource of the electronic device.

10. The electronic device as claimed in claim 9, wherein the local server obtains the specific hardware information from the at least one hardware resource of the electronic device by performing function calls to request services corresponding to the specific hardware information from a kernel of the operating system.

11. The electronic device as claimed in claim 7, wherein the service type comprises obtaining specific hardware information of a neighboring device.

12. The electronic device as claimed in claim 11, wherein the local server transmits a command to the neighboring device to obtain specific hardware information therefrom, and the local server transmits the obtained specific hardware information of the neighboring device to the web application.

13. A local server for use in an electronic device that has an operating system running a browser to use cloud computing to access web applications in the cloud and using the browser as a user interface, wherein the local server has a corresponding URL and a dedicated network port, wherein upon receiving a service request from a web application running in the browser of the operating system of the electronic device, the local server analyzes a service type of the service request and performs an operation to at least one hardware resource corresponding to the service type, wherein the service request is generated and directed to the local server according to the URL and the dedicated network port of the local server by the web application running in the browser of the operating system, and wherein the service request is generated periodically.

14. The local server as claimed in claim 13, wherein the service request is generated periodically by the web application until a response is received from the local server.

15. The local server as claimed in claim 13, wherein the service type comprises obtaining specific hardware information from the at least one hardware resource of the electronic device.

16. The local server as claimed in claim 15, wherein the local server obtains the specific hardware information from the at least one hardware resource of the electronic device by performing function calls to request services corresponding to the specific hardware information from a kernel of the operating system.

17. The local server as claimed in claim 13, wherein the service type comprises obtaining specific hardware information of a neighboring device.

18. The local server as claimed in claim 17, wherein the local server transmits a command to the neighboring device to obtain specific hardware information therefrom, and the local server transmits the obtained specific hardware information of the neighboring device to the web application.

* * * * *